(12) United States Patent
Florentin et al.

(10) Patent No.: US 8,781,709 B2
(45) Date of Patent: Jul. 15, 2014

(54) MONITORING OF A FILTER OF THE FUEL-SUPPLY SYSTEM OF AN AIRCRAFT ENGINE

(75) Inventors: Kim Florentin, Paris (FR); Karim Soyah, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/885,810

(22) PCT Filed: Nov. 21, 2011

(86) PCT No.: PCT/FR2011/052710
§ 371 (c)(1),
(2), (4) Date: May 16, 2013

(87) PCT Pub. No.: WO2012/069745
PCT Pub. Date: May 31, 2012

(65) Prior Publication Data
US 2013/0238215 A1    Sep. 12, 2013

(30) Foreign Application Priority Data

Nov. 26, 2010    (FR) ...................................... 10 59797

(51) Int. Cl.
*G06G 7/70*    (2006.01)
*F02C 7/22*    (2006.01)
*B01D 35/143*    (2006.01)
*F02C 9/26*    (2006.01)

(52) U.S. Cl.
CPC .............. *B01D 35/1435* (2013.01); *F02C 7/22* (2013.01); *F02C 9/26* (2013.01); *Y02T 50/00* (2013.01)
USPC ....................................................... 701/100

(58) Field of Classification Search
CPC .................................................. B01D 35/1435
See application file for complete search history.

(56) References Cited

U.S. PATENT DOCUMENTS 5,477,731 A * 12/1995 Mouton .......................... 73/38
6,430,996 B1 * 8/2002 Anderson et al. .......... 73/170.26
(Continued)

FOREIGN PATENT DOCUMENTS

| | | |
|---|---|---|
| EP | 1 061 243 | 12/2000 |
| FR | 2 705 734 | 12/1994 |
| FR | 2 944 216 | 10/2010 |
| GB | 881 002 | 11/1961 |

OTHER PUBLICATIONS

International Search Report Issued Mar. 15, 2012 in PCT/FR11/52710 Filed Nov. 21, 2011.

*Primary Examiner* — John R Olszewski
*Assistant Examiner* — David Merlino
(74) *Attorney, Agent, or Firm* — Oblon, Spivak, McClelland, Maier & Neustadt, L.L.P.

(57) ABSTRACT

A monitoring method for monitoring a filter of a feed circuit for feeding an aircraft engine with fuel, the method including: detecting clogging of the filter; issuing an indication message; determining a current stage from among a plurality of successive stages of a mission of the aircraft, including at least a stage during which clogging of the filter is not capable of being caused by ice, and a stage during which clogging of the filter might be caused by ice; and in response to detecting clogging, determining the type of clogging as a function of the current stage; wherein during the issuing an indication message, the message that is issued depends on the type of clogging.

11 Claims, 3 Drawing Sheets

(56) References Cited

U.S. PATENT DOCUMENTS

| | | | |
|---|---|---|---|
| 2009/0125167 A1* | 5/2009 | Ma et al. | 701/14 |
| 2009/0271085 A1* | 10/2009 | Buchalter et al. | 701/100 |
| 2012/0032809 A1* | 2/2012 | Comotto et al. | 340/581 |
| 2012/0133283 A1* | 5/2012 | Everett et al. | 315/77 |

\* cited by examiner

MONITORING OF A FILTER OF THE FUEL-SUPPLY SYSTEM OF AN AIRCRAFT ENGINE

BACKGROUND OF THE INVENTION

The invention relates to the general field of aviation. In particular, the invention relates to monitoring a filter of a circuit for feeding fuel to an aircraft engine.

In known manner, the fuel feed circuit of an aircraft engine is provided with a filter for capturing particles present in the fuel by means of a porous filter element. Such capture modifies the porosity of the filter element and that gives rise, under constant operating conditions, to the pressure difference across the filter increasing as a function of time.

That phenomenon is referred to as "clogging", and it increases the resistance of the filter to passing fuel. Clogging can take a shorter or longer length of time depending on the amount of pollution to which the filter is exposed. Clogging caused by particles present in the fuel is referred to as "normal" clogging or as "extreme" clogging depending on the quantities and the types of the particles.

In the event of normal or extreme clogging, it is appropriate to replace the filter element of the filter. It is thus known to measure the head loss across the filter with a pressure difference sensor in order to detect that clogging has occurred. When the head loss across the filter exceeds a certain limit, referred to as the "pre-clogging" threshold, the system is programmed to issue an alarm indicating the need for a maintenance operation.

Furthermore, in the event of clogging being detected, it is also known to open a bypass duct that short-circuits the filter so as to enable fuel to continue to flow through the circuit. Opening takes place automatically as soon as the pressure difference across the terminals of the filter exceeds a certain threshold value (bypass opening threshold) that is higher than the threshold for triggering the issuing of the pre-clogging alarm. When the bypass duct is open, the circuit downstream from the filter is subjected to pollution and it is necessary to perform maintenance that is more burdensome, e.g. removing the engine and cleaning the fuel circuit.

Document FR 2 705 734 describes a monitoring method of the above type, in which an alarm message is issued when the head loss across the filter, corrected by the fuel flow rate, exceeds a predetermined threshold.

Furthermore, it is difficult to avoid water being present in the fuel feed circuit. Unfortunately, in an aircraft, the pressures and the temperatures that might be encountered during a flight can lead to water going to the solid state. Under such icing conditions, clogging of the filter may also be caused by ice.

In the above-mentioned techniques of the prior art there is no way of distinguishing between normal clogging, extreme clogging, and ice clogging. An alarm is thus generated even in the event of ice clogging, with that having the consequence of a maintenance operation always being performed, even though such an operation is not necessary if the clogging is ice clogging.

OBJECT AND SUMMARY OF THE INVENTION

The invention provides a monitoring method for monitoring a filter of a feed circuit for feeding an aircraft engine with fuel, the method comprising:
a step of detecting clogging of the filter; and
a step of issuing an indication message;
the method being characterized in that it comprises:
a step of determining a current stage from among a plurality of successive stages of a mission of the aircraft, comprising at least one first stage during which clogging of the filter is not capable of being caused by ice, and a second stage during which clogging of the filter might be caused by ice; and
in response to detecting clogging, a step of determining the type of clogging as a function of said current stage;
wherein during the step of issuing an indication message, the message that is issued depends on the type of clogging.

In other words, the invention proposes detecting the type of the clogging and adapting the indication message to the type of clogging that has been detected. In the invention, the type of clogging is detected as a function of a current stage in a mission of the airplane, thus making it possible to detect the type of clogging in reliable manner.

In an implementation, when the current stage is a stage during which clogging of the filter might be caused by ice, the step of determining a type of clogging includes a step of testing for icing conditions.

Under such circumstances, after said step of testing for icing conditions, and if said icing conditions are found to exist, the monitoring method may include a step of measuring a detection duration during which clogging has been detected. Thus:
if the detection duration is longer than a predetermined time-out duration, the type of clogging is determined to be extreme clogging and the indication message that is issued indicates that maintenance is necessary; and
if the detection duration is shorter than the time-out duration, the type of clogging is determined as being ice clogging and no indication message indicating a need for maintenance is issued.

Also under such circumstances, and in a variant, after said step of testing for icing conditions, if said icing conditions are found not to exist, the type of clogging is determined as being extreme clogging and the indication message issued indicates a need for maintenance.

By virtue of the various characteristics mentioned above, it is possible to distinguish between clogging caused by ice and extreme clogging. In the event of extreme clogging, an indication message is issued to indicate that maintenance is necessary. In contrast, in the event of ice clogging, either no message is issued, or else a message specific to ice clogging is issued. This makes it possible to avoid performing an unnecessary maintenance operation. In particular, in the absence of a bypass duct being opened or in an aircraft in which the circuit downstream from the filter can accommodate opening of the bypass duct under icing conditions, there is no need to perform a maintenance operation when it is ice clogging that has been detected.

In an implementation, when the current stage is a stage during which clogging of the filter cannot be caused by ice, the type of the clogging is determined to be normal clogging or extreme clogging and the indication message that is issued indicates a need for maintenance.

The step of determining a current stage may include at least one step of testing a condition for passing on to a following stage.

Said successive stages may comprise a first stage during which the aircraft is on the ground prior to takeoff, a second stage during which the aircraft is taking off, a third stage during which the aircraft is in flight, and a fourth stage during which the aircraft is on the ground after landing.

The invention also provides a computer program including instructions for executing a monitoring method in accordance with the invention when the program is executed by a computer.

The invention also provides an electronic unit for controlling a turbine engine, said electronic unit having a memory containing a computer program in accordance with the invention.

This electronic unit may for example be the computer of a gas turbine or it may be a unit that is specific to monitoring the filter.

The invention also provides an aircraft engine comprising a gas turbine and an electronic unit in accordance with the invention.

BRIEF DESCRIPTION OF THE DRAWINGS

The invention can be better understood on reading the following description given by way of non-limiting indication and with reference to the accompanying drawings, in which.

DETAILED DESCRIPTION OF AN IMPLEMENTATION

Figure 1:
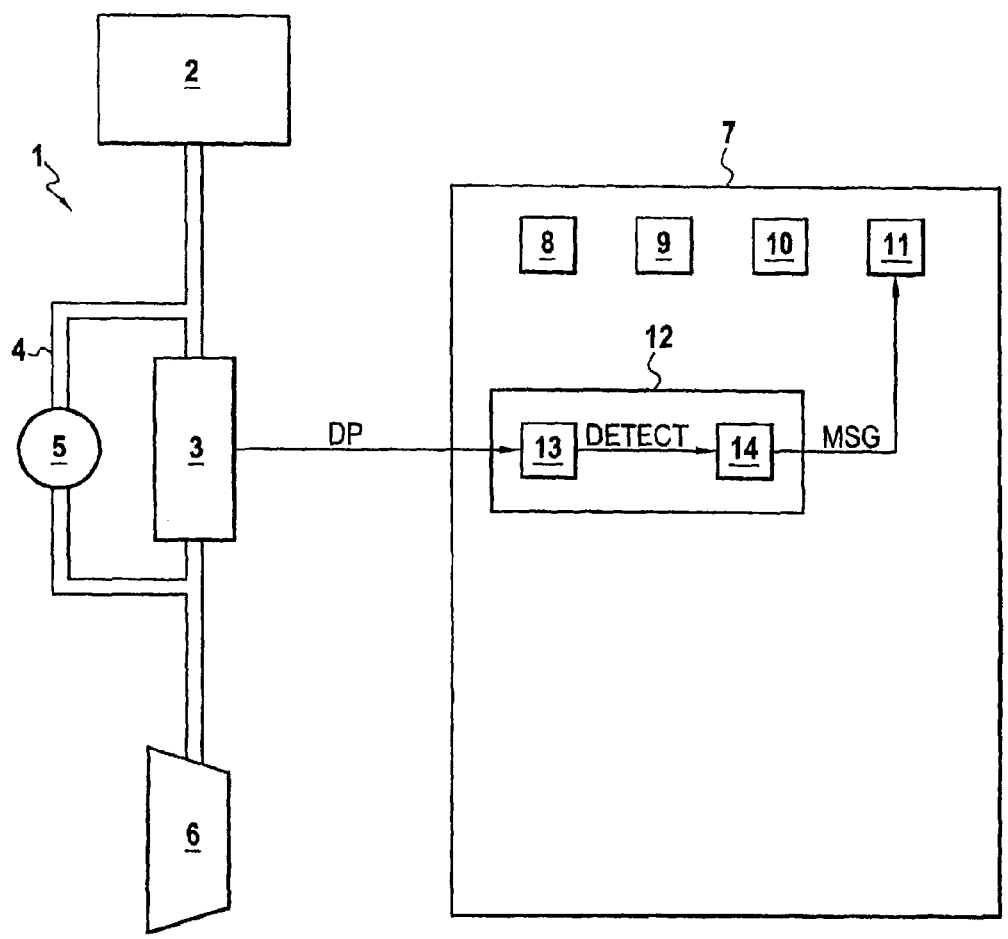
FIG. 1 is a diagram of a fuel feed circuit for a turbine engine and of the electronic control unit of the engine.

FIG. 1 shows a fuel feed circuit 1 for an airplane gas turbine engine, and also an electronic unit 7.

The feed circuit 1 comprises a tank 2, a filter 3, and a bypass duct 4 having a valve 5. It serves to feed fuel to the combustion chamber 6 of the engine.

In known manner, the valve 5 opens automatically when the pressure difference across the filter exceeds a predetermined threshold, known as the bypass opening threshold.

The electronic unit 7 presents the hardware architecture of a computer. It comprises in particular a processor 8, a read only memory (ROM) 9, a random access memory (RAM) 10, and an interface 11. The processor 8 serves to execute computer programs stored in the ROM 9 and making use of the RAM 10. The interface 11 serves in particular to obtain measurement signals and to issue control signals and messages.

The electronic unit 7 performs a method of monitoring the filter 3. This monitoring method may be performed by a computer program 12 stored in the ROM 9 and executed by the processor 8. The monitoring method seeks to detect clogging of the filter 3, and in the event of clogging to issue a message indicating the need to perform a maintenance operation, and it also serves to detect opening of the valve 5. By way of example, the electronic unit 7 may be the engine computer or it may be electronic unit provided specifically for monitoring the filter 3.

More precisely, the program 12 comprises a first module 13 serving to detect clogging, and a second module 14 serving to determine the type of clogging and to issue an indication message as a function of the type of clogging.

The first module 13 detects clogging of the filter 3 in particular as a function of the pressure difference DP, or head loss, across the filter 3. For this purpose, the electronic unit 7 obtains a measurement signal representative of the pressure difference DP, e.g. coming from a differential pressure sensor of the strain gauge type. The first module 13 applies a safety margin such that if no clogging is detected during takeoff of the airplane, then it is then possible for the airplane to perform a complete mission with a normal level of contamination.

The person skilled in the art is capable of implementing such a module 13 without needing a more detailed description. For example, in the document mentioned in the introduction, clogging is detected when the pressure difference DP, corrected for the fuel flow rate, exceeds a predetermined threshold referred to as the pre-clogging threshold. The pre-clogging threshold may be selected so as to allow the aircraft to complete its mission without reaching an unacceptable level of clogging. In a variant, other clogging detection techniques may be used.

The first module 13 delivers a binary signal DETECT to the second module 14, which signal may, for example, be equal to 1 when clogging has been detected, and to 0 when no clogging has been detected.

In a variant, the module 13 also detects opening of the valve 5. Under such circumstances, the module 13 also provides a binary signal to the module 14 indicating whether the valve 5 is open.

The second module 14 determines the current stage of the mission of the aircraft and it determines the type of clogging as a function of the current stage. The successive stages of the mission of an aircraft are described below with reference to FIG. 2, and the determination of the type of clogging is described below with reference to FIG. 3.

Figure 2:
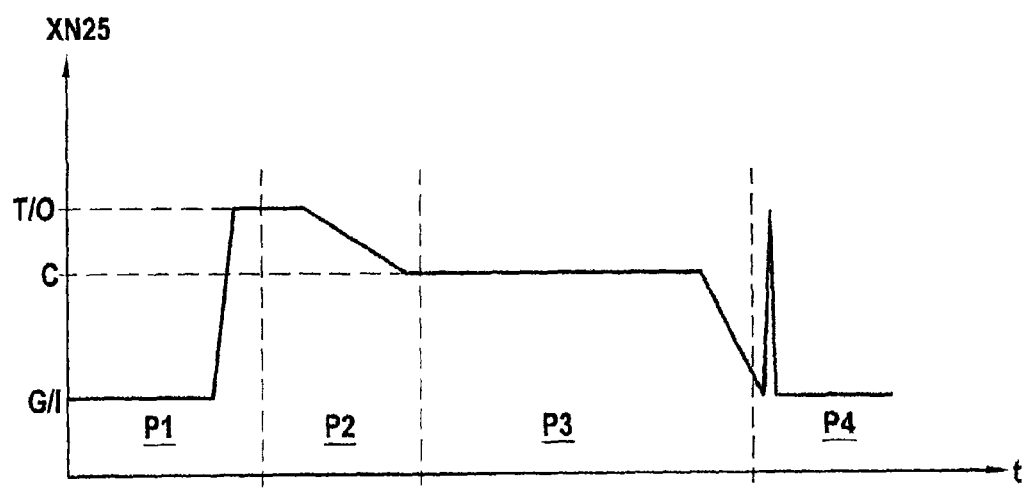
FIG. 2 is a graph showing the speed of a turbine engine as a function of time, during a mission of an aircraft.

FIG. 2 is a graph and it shows the speed of the turbine engine as a function of time t during a mission of the aircraft. In this example, the speed under consideration is the speed known as XN25, however any other data representative of the speed of the engine could be used. FIG. 2 shows that the mission of the aircraft is subdivided into four successive stages, given respective references P1, P2, P3, and P4.

During stage P1, the airplane is on the ground. The initially stopped engine is started and then runs at a ground idle (G/I) speed. Thereafter, its speed increases rapidly, up to its takeoff (T/O) speed.

During this stage P1, clogging is not likely to be produced by ice. Even under icing conditions, the flow rate of fuel passing through the filter 3 during the transient takeoff period is limited. The mass of ice injected into the filter 3 during this transient starting period is therefore not sufficient to clog the filter, unless the filter was already at an advanced stage of clogging. Thereafter, at the ground idle speed G/I, the motor is hot and the temperature of the fuel in the filter 3 is positive, thereby having the effect of melting any ice that might be present. Finally, the duration that elapses between passing on to takeoff speed T/O and the beginning of stage P2 is too short to accumulate sufficient ice in the filter.

In contrast, normal or extreme clogging may be caused by pollution during stage P1 and may then be detected by the module 13. On passing from the ground idle speed to takeoff speed, the increase in the flow rate of fuel passing through the filter 3 has the effect of increasing head loss across the filter 3, and that can lead to clogging being detected.

Furthermore, if no clogging is detected during stage P1, then any clogging that is detected during the following stages P2 and P3 is not normal clogging. As explained above, the first module 13 applies a safety margin so that in the event of no clogging being detected during takeoff of the airplane, and with a level of contamination that is normal, the airplane can be sure of performing its complete mission.

During stage P2, the engine runs at takeoff speed T/O and the airplane takes off. Thereafter its speed decreases progressively until it reaches a cruising speed, written C.

As explained above, any clogging detected during stage P2 is not normal clogging. In the absence of icing conditions, it thus constitutes extreme clogging. In the presence of icing conditions, it is either extreme clogging or else ice clogging, and a distinction is drawn between those two circumstances during the stage P3.

During stage P3, the aircraft is in flight and its engine is running at cruising speed C. Thereafter, at the end of stage P3, the aircraft begins its descent and engine speed decreases progressively.

As mentioned above, clogging detected during stage P3 is not normal clogging. Furthermore, in flight at cruising speed, the temperature of the fuel increases progressively. Thus, ice clogging cannot occur during stage P3. Any clogging that appears during stage P3 is thus extreme clogging.

If clogging is detected during stage P2 and continues during stage P3 in spite of the increase in the temperature of the fuel, then the clogging is likewise extreme clogging.

In contrast, if clogging is detected during stage P2 but is no longer detected during stage P3 as a result of the increase in the temperature of the fuel, then the clogging is ice clogging.

During stage P4, the aircraft has landed and is on the ground. At the beginning of stage P4, engine speed increases suddenly while the thrust reversers are actuated. Thereafter, the engine runs at ground idle speed G/I.

As during stage P1, the increase in speed while the thrust reversers are actuated gives rise to an increase in head loss across the filter 3, and that can lead to normal or extreme clogging being detected by the module 13.

Figure 3A:
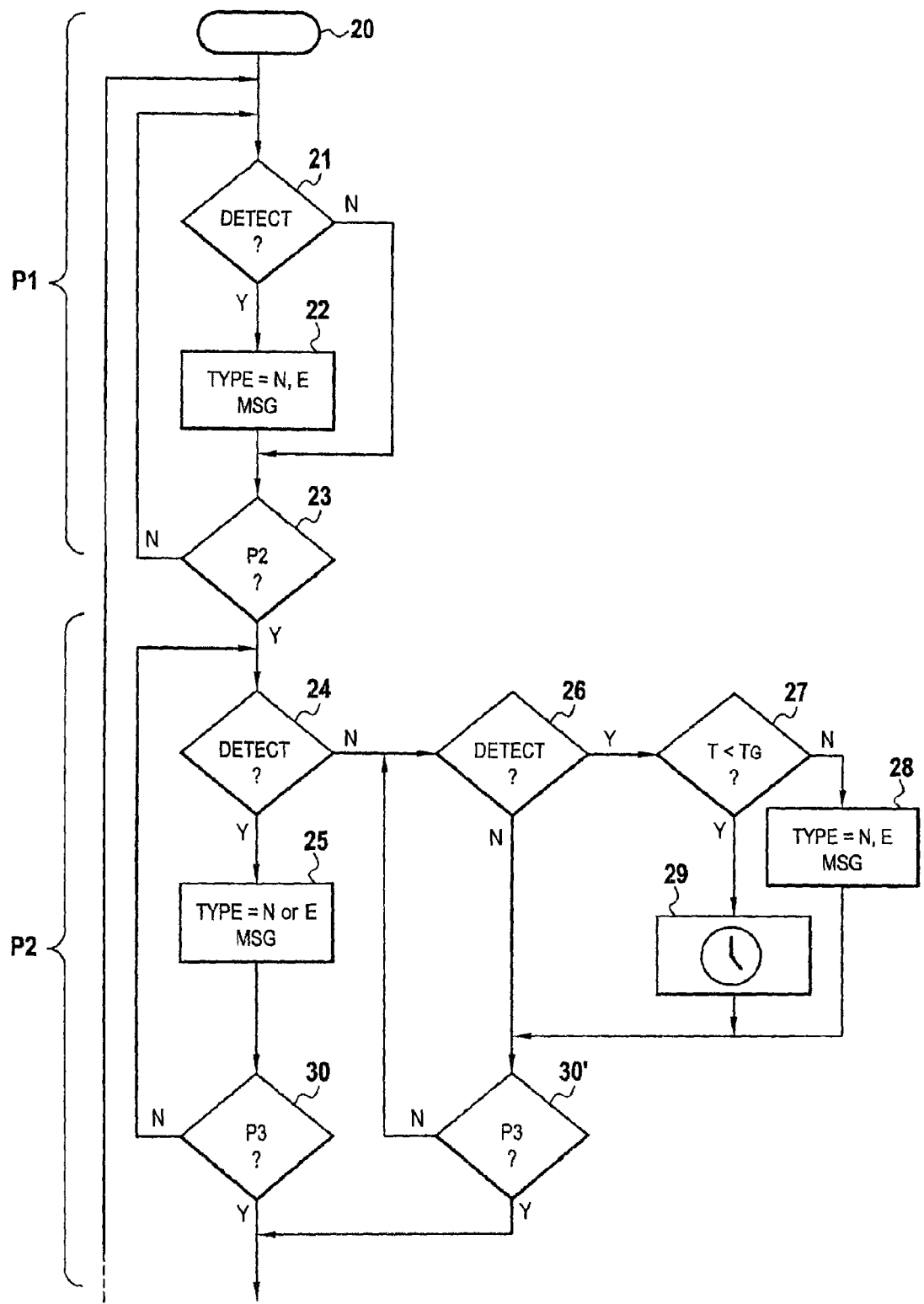
FIGS. 3A and 3B together show a flow chart of a monitoring method in an implementation of the invention.
Figure 3B:
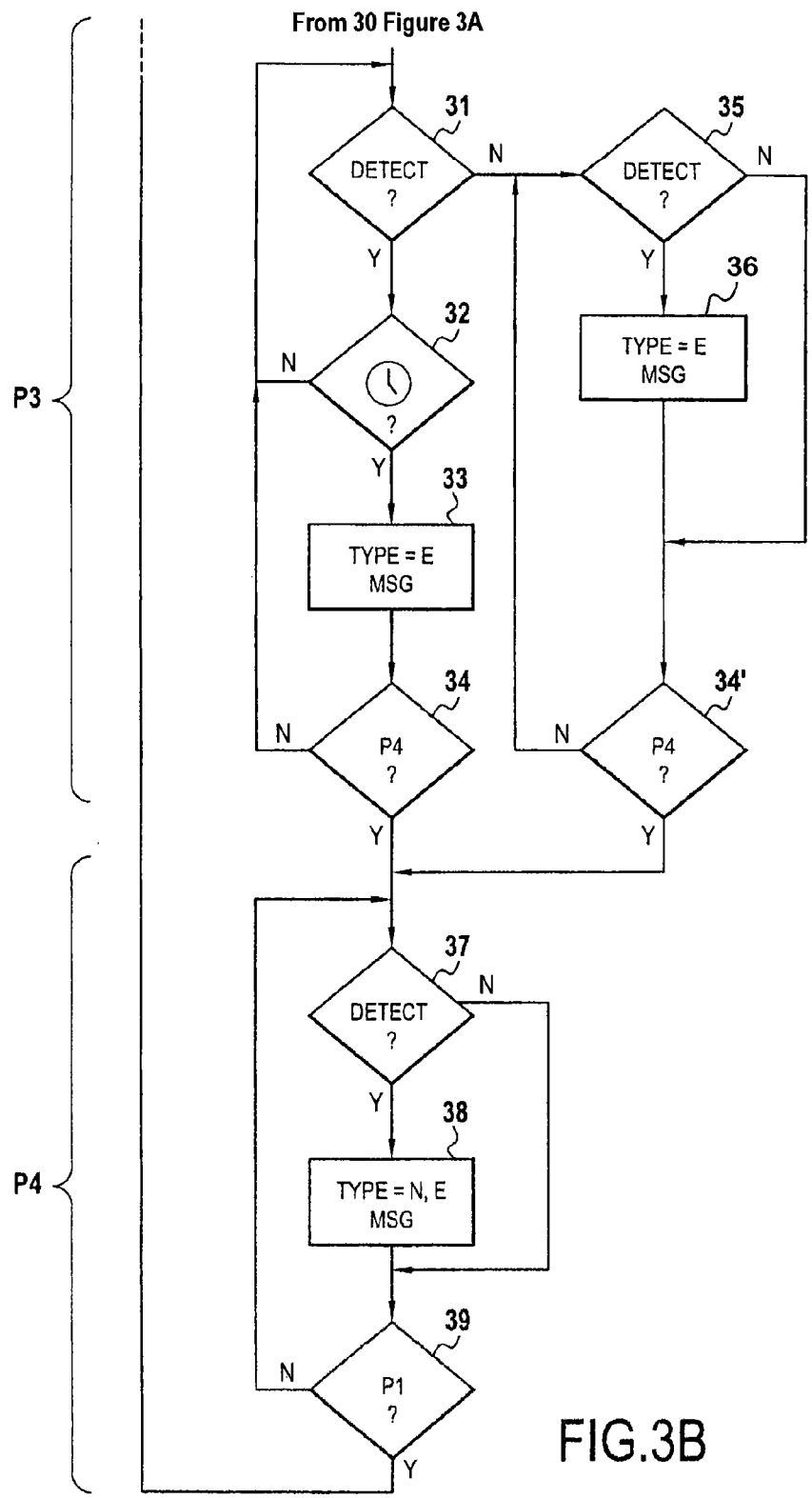

FIGS. 3A and 3B together constitute a flow chart showing the various steps of the monitoring method performed by the second module 14.

Steps 21 to 23 correspond to stage P1. The module 14 begins at 20 while the aircraft is on the ground and the engine is starting. Therefore, in step 21, the module 14 determines whether the module 13 has detected clogging.

If no clogging is detected in step 21, the module 14 moves on directly to step 23 as described below.

In contrast, if clogging is detected, in step 22 the module 14 determines whether the clogging is normal or extreme. As explained above with reference to FIG. 2, ice cannot give rise to clogging during stage P1. Thus, the module 14 issues a message indicting that clogging has taken place and that a maintenance operation is necessary. By way of example, this message is sent to a display in the cockpit and/or to a memory that stores the information for maintenance purposes.

When the pilot observes on the display that clogging has been detected, the normal procedure is to abort takeoff and to replace the filter. There is no need to distinguish between normal clogging and extreme clogging since in both cases a maintenance operation is necessary. A visual inspection can then make it possible to distinguish between normal clogging and extreme clogging.

Thereafter, in step 23, the module 14 tests whether the condition of passing on to stage P2 is satisfied. For example, the condition for passing on to stage P2 is satisfied when the speed of the airplane is greater than a threshold speed, or in the event of the airplane speed indicator being defective, whether the weight on wheel (WOW) indicator of the airplane landing gear (known to the person skilled in the art) indicates that the airplane is no longer on the ground.

If the condition for passing on to stage P2 is not satisfied, the module 14 loops back to step 21. Otherwise, if the condition for passing on to stage P2 is satisfied, the module 14 passes on to step 24.

Steps 24 to 30' thus correspond to stage P2.

In step 24, the module 14 determines whether the module 13 has detected clogging.

Since step 24 follows directly after passing on to stage P2, any clogging detected in step 24 corresponds to clogging that had already been detected in step 21 of stage P1. It is therefore clogging that is either normal or extreme, as explained above. Under such circumstances, in step 25, the module 14 issues a message indicating the presence of clogging, as in step 22. Thereafter, the module 14 passes on to step 30.

In step 30, the module 14 tests whether a condition for passing on to stage P3 is satisfied. For example, the condition for passing on to stage P3 is satisfied when the flow rate injected into the combustion chamber 6 is less than a threshold rate (climb rate) or, in the event that the injected flow rate indicator is faulty, when the injected rate as indicated by a sensor of the airplane is less than said threshold rate. In the event of there being a fault also on the injected rate as indicated by the airplane sensor, the condition of step 30 defaults always to be true.

Depending on the result of the test in step 30, the module 14 loops back to step 24 or passes on to step 31 of stage P3.

If no clogging is detected in step 24, then the module passes on to step 26. Clogging detected during the remainder of stage P2 is then no longer clogging that had already been detected during stage P1. As explained above, clogging is then either ice clogging or extreme clogging.

In step 26, the module 14 determines whether clogging has been detected by the module 13. If no clogging is detected, the module 14 passes on to above-described step 30'. If clogging is detected, the module 14 passes on to step 27.

In step 27, the module 14 determines whether the filter 3 is in the presence of icing conditions. For example the temperature T of the fuel in the filter 3 is compared with an icing condition threshold temperature Tg.

In the absence of icing conditions, that means that the clogging detected in step 26 is extreme clogging, as explained above. Thus, in step 28, the module 14 determines that the clogging that has been detected is extreme clogging and it issues a corresponding message indicating the need for a maintenance operation. The message of step 28 differs from the messages of step 22 and 25 in order to specify that it relates to clogging that is extreme. Such a message that is of greater criticality in the event of extreme clogging gives airlines the chance to define the most appropriate actions to be taken by the pilot, e.g. seeking to avoid running the risk of opening the valve 5.

In contrast, in the presence of icing conditions, the clogging that is detected in step 26 might be extreme clogging or it might be ice clogging, as explained above. Under such circumstances, in step 29, the module 14 starts a timer that makes it possible during stage P3 to distinguish between these two possibilities.

After step 26, 28, or 29, the module 14 tests in step 30' whether the condition for passing on to stage P3 is satisfied. The condition of step 30' may be the same as the condition of step 30. Depending on the result of the test in step 30', the module 14 loops back to step 26 or passes on to step 31 in stage P3.

Steps 31 to 34' thus correspond to stage P3.

In step 31, the module 14 determines whether the module 13 has detected clogging. If no clogging is detected, then in step 31 the module 14 passes on to step 35. Otherwise, if clogging is detected, the module 14 passes on to step 32.

Since step 31 follows directly from passing on to stage P3, any clogging detected in step 31 corresponds to clogging that had already been detected in step 24 or 26 of stage P2. Under such circumstances, in step 32, the module 14 verifies the state of the timer mentioned above with reference to step 29.

If the timer has been started but has not timed out, that means that step 29 was executed, but that for the time being the length of time that has elapsed since clogging was detected is shorter than the time-out duration of the timer. The module 14 thus determines, for the time being, that the clogging might be extreme clogging or it might be ice clogging, and it loops back to step 31. No message is issued.

If the timer has not been started, that means that step 29 was not executed and that the clogging that has been detected is therefore not ice clogging. If the timer was started and has timed out, that means that step 29 was executed and that the length of time that has elapsed since clogging was detected is longer than the time-out duration of the timer.

Either way, in step 33, the module 14 determines that the clogging is extreme clogging and it issues a corresponding message. By way of example, the message of step 33 is the same as the message of step 28.

Thereafter, the module 14 passes on to step 34.

In step 34, the module 14 tests whether a condition for passing on to stage P4 is satisfied. For example, the condition for passing on to stage P4 is satisfied when the flow rate injected into the combustion chamber 6 is less than some other threshold flow rate (descent flow rate), or in the event that the injected flow rate indicator is faulty, when the engine speed is below a threshold speed (descent speed). In the event of the speed measurement also failing, the condition of step 34 defaults to being always false.

Depending on the result of the test in step 34, the module 14 loops back to step 31 or else passes on to step 37 of stage P4.

In the event of ice clogging being detected in step 26, the timer is engaged in step 29 of stage P2. Thereafter, during stage P3, the module 14 loops through steps 31 and 32. As explained above, the temperature of the fuel increases progressively and after a certain length of time shorter than the time-out duration of the timer, clogging is no longer detected. Under such circumstances, step 31 then leads to step 35.

Clogging detected thereafter during stage P3 is thus not clogging that had already been detected in stage P2. As explained above, such clogging is extreme clogging.

In step 35, the module 14 determines whether the module 13 has detected clogging. If no clogging is detected, the module 14 passes on to above-described step 34'. If clogging is detected, the module 14 passes on to step 36.

In step 36, the module 14 thus determines that the clogging that has been detected is extreme clogging and it issues a corresponding message. The message of step 36 may be the same as the message of steps 28 and 33, for example.

After step 35 or step 36, and in step 30', the module 14 tests whether a condition for passing on to stage P4 is satisfied. The condition of step 34' may be the same as the condition of step 34. Depending on the result of the test in step 34', the module 14 loops back to step 35 or it passes on to step 37 of stage P4.

Steps 37 to 39 correspond to stage P4.

In step 37, the module 14 determines whether the module 13 has detected clogging.

If no clogging is detected in step 37, the module 14 passes directly to step 39 as described below.

In contrast, if clogging is detected, the module 14 determines in a step 38 whether the clogging is normal or extreme. As explained above with reference to FIG. 2, both of these types of clogging might be detected during stage P4. Thus, the module 14 issues a message indicating that clogging has occurred. This message may for example be the same as the message of step 22.

Thereafter, in step 39, the module 14 tests whether a condition for passing on to stage P1 is satisfied. For example, the condition for passing on to stage P1 is satisfied when the injected flow rate is less than a minimum flow rate threshold or when the airplane master lever is in the OFF position. If the injected flow rate indicator is faulty, the condition is also satisfied if the engine speed is less than another threshold speed (minimum speed). In the event of the speed indicator also being faulty, the condition of step 39 defaults to being always true.

If the condition for passing on to stage P1 is false, the module 14 loops back to step 37. Otherwise, if the condition for passing on to stage P1 is true, the module 14 loops back to step 21.

It can thus be seen that the module 14 makes it possible to determine the type of clogging that is detected by the module 13 as a function of the current stage, and to issue an indication message as a function of the type of the clogging. Specifically, if the current stage is a stage during which clogging cannot be caused by ice (stage P2 or stage P3), then the module 14 serves to distinguish between extreme clogging and ice clogging. In the event of ice clogging, the module 14 does not issue a message indicating that a maintenance operation is needed. It is thus possible to avoid pointless maintenance operations.

The steps 23, 30, 30', 34, 34', and 39 serve to detect the current stage. The steps described above with reference to each stage enable the type of clogging to be determined as a function of the current stage.

As explained above, the monitor 13 may detect that the valve 5 has been opened and the pilot may be informed, e.g. as a result of the head loss across the filter exceeding an opening threshold that is higher than the pre-clogging threshold used for detecting imminent clogging. The above description relates to an airplane in which the circuit downstream from the filter 3 is capable of accommodating opening of the valve 5 under icing conditions.

With an airplane in which the circuit downstream from the filter 3 is damaged by opening the valve 5 under icing conditions, then opening the valve 5 causes a message to be issued that indicates that a maintenance operation is needed, even in the event of it being determined that the clogging is ice clogging.

The invention claimed is:

1. A monitoring method for monitoring a filter of a feed circuit for feeding an aircraft engine with fuel, the method comprising:
   detecting clogging of the filter;
   issuing an indication message;
   defining a plurality of successive stages of a mission of the aircraft, comprising at least a stage during which clogging of the filter is not capable of being caused by ice, and a stage during which clogging of the filter might be caused by ice;
   determining a current stage from among said plurality of successive stages; and
   in response to detecting clogging, determining a type of clogging as a function of the current stage from a normal clogging, an extreme clogging, and an ice clogging;
   wherein during the issuing an indication message, the message that is issued depends on the type of clogging.

2. A monitoring method according to claim 1, wherein, when the current stage is a stage during which clogging of the filter might be caused by ice, the determining a type of clogging includes testing for icing conditions.

3. A monitoring method according to claim 2, further comprising after the testing for icing conditions, and if the icing conditions are found to exist, measuring a detection duration during which clogging has been detected, wherein:

if the detection duration is longer than a predetermined time-out duration, the type of clogging is determined to be extreme clogging and the indication message that is issued indicates that maintenance is necessary; and if the detection duration is shorter than the time-out duration, the type of clogging is determined as being ice clogging and no indication message indicating a need for maintenance is issued.

4. A monitoring method according to claim 2, wherein, after the testing for icing conditions, if the icing conditions are found not to exist, the type of clogging is determined as being extreme clogging and the indication message issued indicates a need for maintenance.

5. A monitoring method according to claim 2, wherein the stage during which clogging of the filter might be caused by ice is a stage during which the aircraft is taking off.

6. A monitoring method according to claim 1, wherein, when the current stage is a stage during which clogging of the filter cannot be caused by ice, the type of the clogging is determined to be normal clogging or extreme clogging and the indication message that is issued indicates a need for maintenance.

7. A monitoring method according to claim 1, wherein the determining a current stage includes at least one testing a condition for passing on to a following stage.

8. A monitoring method according to claim 1, wherein the successive stages comprise a first stage during which the aircraft is on the ground prior to takeoff, a second stage during which the aircraft is taking off, a third stage during which the aircraft is in flight, and a fourth stage during which the aircraft is on the ground after landing.

9. A non-transitory computer readable medium including computer executable instructions configured to execute a monitoring method for monitoring a filter of a feed circuit for feeding an aircraft engine with fuel when executed by a computer, the monitoring method comprising:

detecting clogging of the filter;

issuing an indication message;

defining a plurality of successive stages of a mission of the aircraft, comprising at least a stage during which clogging of the filter is not capable of being caused by ice, and a stage during which clogging of the filter might be caused by ice;

determining a current stage from among said plurality of successive stages; and in response to detecting clogging, determining a type of clogging as a function of the current stage from a normal clogging, an extreme clogging, and an ice clogging;

wherein during the issuing an indication message, the message that is issued depends on the type of clogging.

10. An electronic unit for controlling a turbine engine, the electronic unit comprising the non-transitory computer readable medium according to claim 9.

11. An aircraft engine comprising a gas turbine and an electronic unit according to claim 10.

* * * * *